US006937189B2

(12) United States Patent
Kim

(10) Patent No.: US 6,937,189 B2
(45) Date of Patent: Aug. 30, 2005

(54) ADAPTIVE BEAMFORMING APPARATUS AND METHOD

(75) Inventor: Sang-Choon Kim, Busan (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 10/364,398

(22) Filed: Feb. 12, 2003

(65) Prior Publication Data

US 2003/0201936 A1 Oct. 30, 2003

(30) Foreign Application Priority Data

Apr. 30, 2002 (KR) ........................................ 2002-23785

(51) Int. Cl.[7] .................................................. H01Q 3/24
(52) U.S. Cl. ........................................ 342/372; 342/374
(58) Field of Search ................................ 342/372, 374, 342/377, 378; 367/119–125

(56) References Cited

U.S. PATENT DOCUMENTS 6,128,276 A * 10/2000 Agee .......................... 375/347
6,426,973 B1 * 7/2002 Madhow et al. ............ 375/231

FOREIGN PATENT DOCUMENTS

KR 000055962 A 9/2000

OTHER PUBLICATIONS

P. Roy, Fractionally Spaced Blind Equalizer Performance Improvement, Master of Science Thesis in Electrical Engineering, Virginia Polytechnic Institute and State University, p. 1–24, Jan. 2000.*

M. Joho et al., Combined blind/nonblind source separation based on the natural gradient, IEEE Signal Processing Letters, vol. 8(8), p. 236–238, Aug. 2001.*

L. Tong et al., Blind predictive decision–feedback equalization via the constant modulus algorithm, IEEE International Conference on Acoustics, Speech, and Signal Processing, vol. 5, p. 3901–3904, Apr. 1997.*

English Translation of KR 000055962 A.*

* cited by examiner

*Primary Examiner*—Thomas H. Tarcza
*Assistant Examiner*—Fred H. Mull
(74) *Attorney, Agent, or Firm*—Fleshner & Kim, LLP

(57) ABSTRACT

Disclosed are an adaptive beamforming apparatus and method that despreads an input signal, and determines whether a symbol of despread signal belongs to a pilot sub-channel or non-pilot sub-channel of the despread signal. One of two beamforming algorithms is accordingly enabled. If the symbol belongs to the pilot sub-channel, a first algorithm is used to calculate a weight vector, and if the symbol belongs to the non-pilot sub-channel, a second algorithm is used to calculate the weight vector. A current weight vector is updated using newly calculated weight vector, and a beam pattern is formed based on the updated weight vector.

9 Claims, 4 Drawing Sheets

ADAPTIVE BEAMFORMING APPARATUS AND METHOD

BACKGROUND OF THE INVENTION

1. Field of the Invention

The present invention relates to an adaptive beamforming apparatus and method, and in particular to an improved weight vector update technique for the adaptive beamforming apparatus and method.

2. Background of the Related Art

In wireless communication systems, various diversity methods are used to increase the coverage area and capacity of a system. For example, use of a rake receiver architecture provides an effective immunity to the inter-symbol interference (ISI) in multipath propagation environments that cause the same signal to be repeatedly received at an antenna at a plurality of different time intervals.

Recently, directive antennas have been used to increase the signal-to-noise ratio (SNR) by increasing the energy radiated to a desired mobile terminal while simultaneously reducing the interference energy radiated to other remote mobile terminals. Such reduction in the interference energy radiated to the other mobile terminals can be achieved by generating spatially selective, directive transmission beam patterns.

One of the directive antenna techniques used to achieve such beam patterns is adaptive beamforming, in which the beam pattern produced by beamforming antenna arrays of the base station adapts in response to changing multipath conditions. In such beamforming arrays, the antenna beam pattern is generated so as to maximize signal energy transmitted to and received from an intended mobile terminal.

In order to adapt to the change of the multipath condition, each Angle of Departure (AOD) at which energy is to be transmitted from the base station antenna array to the intended mobile terminal must be determined. Each AOD is determined by estimating each Angle of Arrival (AOA) at the base station of signal energy from the mobile terminal. In the adaptive beamforming antenna systems, a weight vector concept is used to estimate an AOA spectrum corresponding to a desired AOD spectrum.

A Least Means Square (LMS) algorithm is one kind of adaptive beamforming algorithm, and uses only the pilot channel for transmitting a reference signal (non-blind beamforming algorithm).

In the LMS algorithm, the weight vector to minimize a mean square error is calculated using a pilot symbol as a training signal. The weight vector is calculated by the following equation 1 in the LMS algorithm.

$$w_k(m+1) = w_k(m) - \mu r_{DPCCH\_k}(m)[d_{k,c}(m) - w_k^H(m) r_{DPCCH\_k}(m)]^H \quad \langle\text{Equation 1}\rangle$$

$$r_{DPCCH\_K}(m) = [r^0_{DPCCH\_k}(m) r^1_{DPCCH\_k}(m) \ \dots \ r^{(P-1)}_{DPCCH\_k}(m)]^H$$

$$w_k(m) = [w_k^{(0)}(m) w_k^1(m) \ \dots \ w_k^{(P-1)}(m)]^H$$

where w is weight vector, and, is a weight vector update coefficient.

Another adaptive beamforming algorithm is the Constant Modulus Algorithm (CMA). The CMA is a blind adaptive beamforming algorithm that uses a constant envelope signal rather than the training signal. This means that there is no intended amplitude modulation. In the CMA, the weight vector is calculated by the following equation 2.

$$y_{DPCCH\_k}(m) = w_k^H(m) r_{MPCCH\_k}(m) \quad \langle\text{Equation 2}\rangle$$

$$e_{DPCCH\_k}(m) = 2\left( y_{DPCCH\_k}(m) - \frac{y_{DPCCH\_k}(m)}{|y_{DPCCH\_k(m)}|} \right)$$

$$w_k(m+1) = w_k(m) - \mu r_{DPCCH\_k}(m) e^*_{DPCCH\_k}(m)$$

The related art adaptive beamforming methods have various problems. For example, the LMS algorithm converges to an optimal value slowly. Hence, it is difficult to employ the LMS algorithm in fast fading radio environments. Additionally, with regard to CMA, since it is a blind adaptive algorithm, its convergence speed is slower than those algorithms that use the training signals. Also, the convergence characteristics of the CMA are not precisely defined relative to the LMS algorithm.

Even though there exist various other beamforming algorithms, most of them are much too complex to apply to the radio systems, as compared to the LMS and CMA. Accordingly, such algorithms are problematic.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide an adaptive beamforming apparatus and method capable of producing an optimum beam pattern by accurately estimating the AOA spectrum.

It is another object of the present invention to provide an adaptive beamforming apparatus and method capable of improving a system capacity and communication quality by generating an optimum beam pattern to a mobile terminal.

To achieve at least the above objects in whole or in parts, there is provided an adaptive beamforming apparatus including a despreader for despreading an input signal, a weight vector calculation module for calculating a weight vector in unit of symbol outputted from the despreader, and a beamformer for generating beam pattern using an output symbol from the despreader and the weight vector from the weight vector calculation module, wherein the weight vector calculation module includes a weight vector estimator for selecting one of two beamforming algorithms according to the type of the output symbol. The beamforming algorithms are LMS and CMA algorithms.

The type of the output symbol is determined according to a sub-channel of a DPCCH slot. The DPCCH slot is divided into a pilot sub-channel and a non-pilot sub-channel. The weight vector estimator selects the LMS algorithm if the output symbol belongs to the pilot sub-channel and the CMA algorithm if the output symbol belongs to the non-pilot sub-channel.

If the beamforming algorithm is changed from the LMS algorithm to the CMA algorithm, the CMA algorithm uses a last (i.e., previous) weight vector calculated by the LMS algorithm as an initial weight vector thereof. Conversely, if the beamforming algorithm is changed from the CMA algorithm to the LMS algorithm, the LMS algorithm uses a last (i.e., previous) weight vector calculated by the CMA algorithm as an initial weight vector thereof.

Additionally, to achieve at least the above objects in whole or in parts, there is further provided an adaptive beamforming method comprising despreading an input signal, determining whether a despread signal is a DPCCH signal, determining whether the symbol belongs to a pilot sub-channel or non-pilot sub-channel of the DPCCH signal, enabling one of two beamforming algorithms if the symbol belongs to the pilot sub-channel, enabling the other one of two algorithms if the symbol belongs to the non-pilot sub-channel, updating the weight vector using a calculated weight vector, and forming a beam pattern based on the updated weight vector. The two beamforming algorithms are LMS and CMA algorithms.

If the beamforming algorithm is changed from the LMS algorithm to the CMA algorithm, the CMA algorithm uses a last weight vector calculated by the LMS algorithm as an initial weight vector thereof. If, on the other hand, the beamforming algorithm is changed from the CMA algorithm to the LMS algorithm, the LMS algorithm uses a last weight vector calculated by the CMA algorithm as an initial weight vector thereof.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed Out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will be described hereinafter with reference to the accompanying drawings.

The uplink dedicated physical channel (DPCH) defined by the 3GPP comprises three-layer structure of a superframe, a radio frame, and a slot. There are two types of DPCHs. The first type is a dedicated physical data channel (DPDCH) for transferring, dedicated data and the second type is a dedicated physical control channel (DPCCH) for transferring control information.

Figure 1:
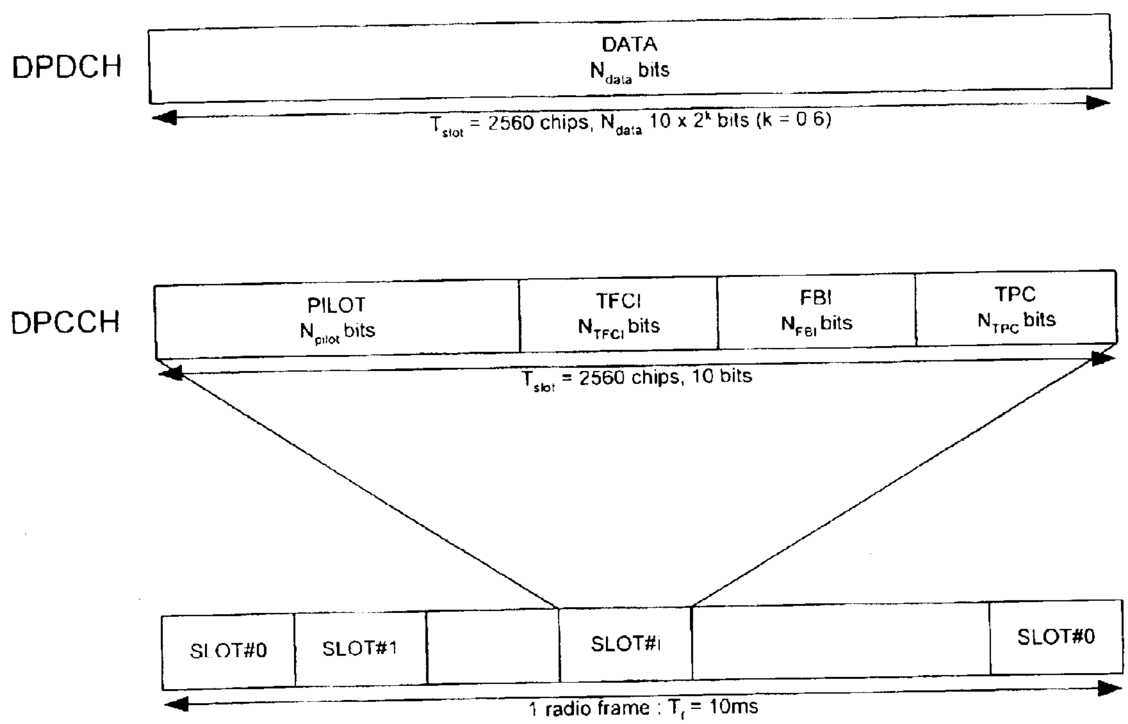
FIG. 1 is a radio frame structure illustrating an uplink DPDCH and DPCCH configuration.

FIG. 1 illustrates an uplink radio frame structure according to the 3GPP RAIN specification as used by the preferred embodiment.

As shown in FIG. 1, an uplink DPCH radio frame includes a plurality of slots (slot#0-slot#14). A DPCCH slot includes a pilot field, a transport format combination indicator (TFCI) field, a format byte integer (FBI) field, and a transmit power control (TPC) field.

Figure 2:
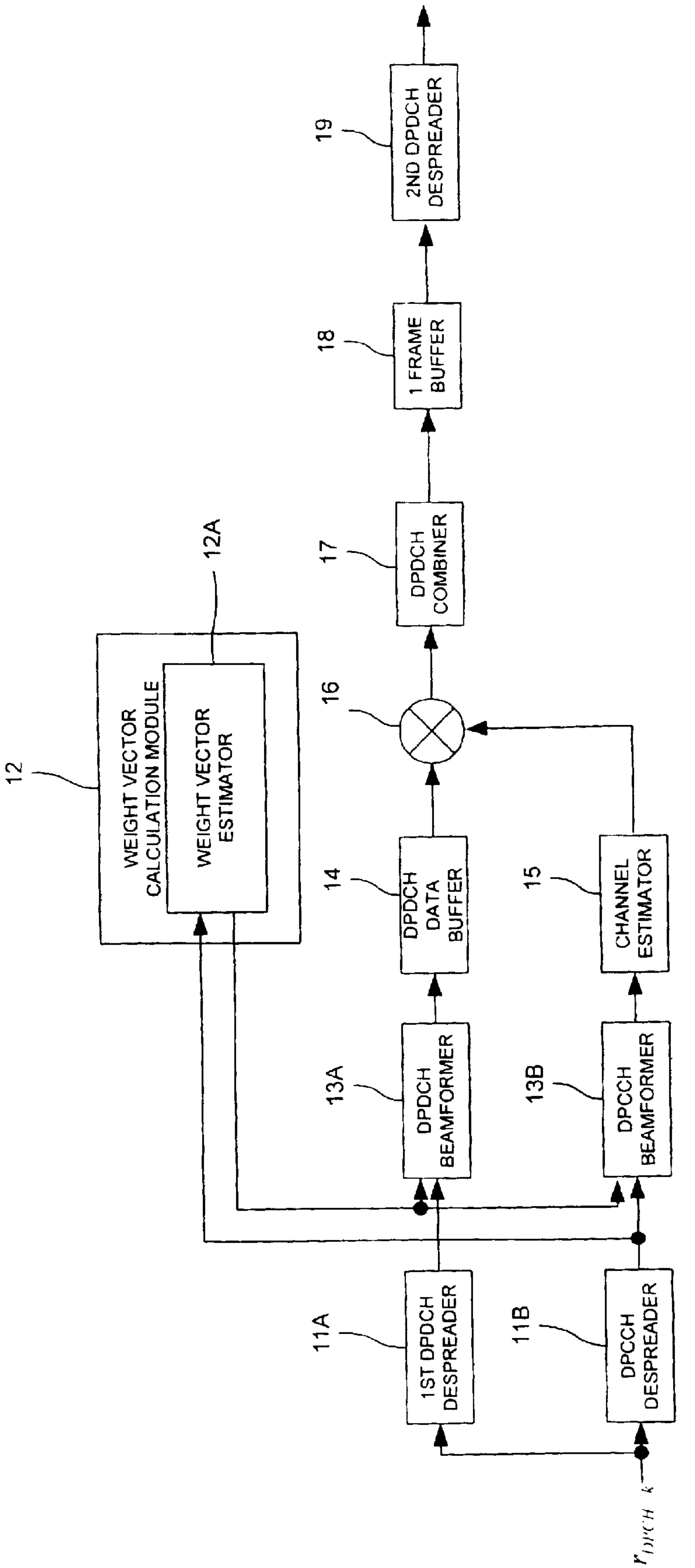
FIG. 2 is a block diagram illustrating an adaptive beamforming apparatus according to a preferred embodiment of the present invention.

FIG. 2 illustrates an adaptive beamforming apparatus according to a preferred embodiment of the present invention. As shown in FIG. 2, the adaptive beamforming apparatus of the present invention preferably includes a first Dedicated Physical Data Channel (DPDCH) despreader 11A and a Dedicated Physical Control Channel (DPCCH) despreader 11B for respectively despreading a data channel signal and a control channel signal from a dedicated physical channel signal $r_{DPCH\_k}$ received from an antenna (not shown). The apparatus preferably further includes a weight vector calculation module 12 to calculate a weight vector of the signal despread at the DPCCH despreader 11B in a symbol unit.

The weight vector calculation module 12 includes an adaptive weight vector estimator 12A which estimates the weight vector using different weight vector update algorithms according to a sub-channel of a DPCCH slot.

A DPDCH beamformer 13A is provided to multiply the despread signal with the weight vector calculated at the weight vector calculation module 12 and sum the multiplied signal with identically processed signals. The identically processed signal are respectively received through other antennas. The apparatus further includes a DPCCH beamformer 13B to multiply the despread signal with the weight vector calculated at the weight vector calculation module and to sum the multiplied signal with identically processed signals that are respectively received through other antennas. Next, a DPDCH data buffer 14 is provided to store output signals from the DPDCH beamformer 13A, and a channel estimator 15 is provided for compensating the channel using the signal from the DPCCH beamformer 13B. The apparatus further includes a multiplier 16 for multiplying the output signal from the DPDCH data buffer 14 by the output signal from the channel estimator 15 to compensate the output signal of the DPDCH data buffer 14. A DPDCH combiner 17 is also provided to combine signals from the multiplier 16 into a frame and a frame buffer 18 is provided to store the frame from the DPDCH combiner 17. Finally, a second DPDCH despreader 19 is provided to despread the frame from the frame buffer 18 and then output the despread frame.

Figure 3:
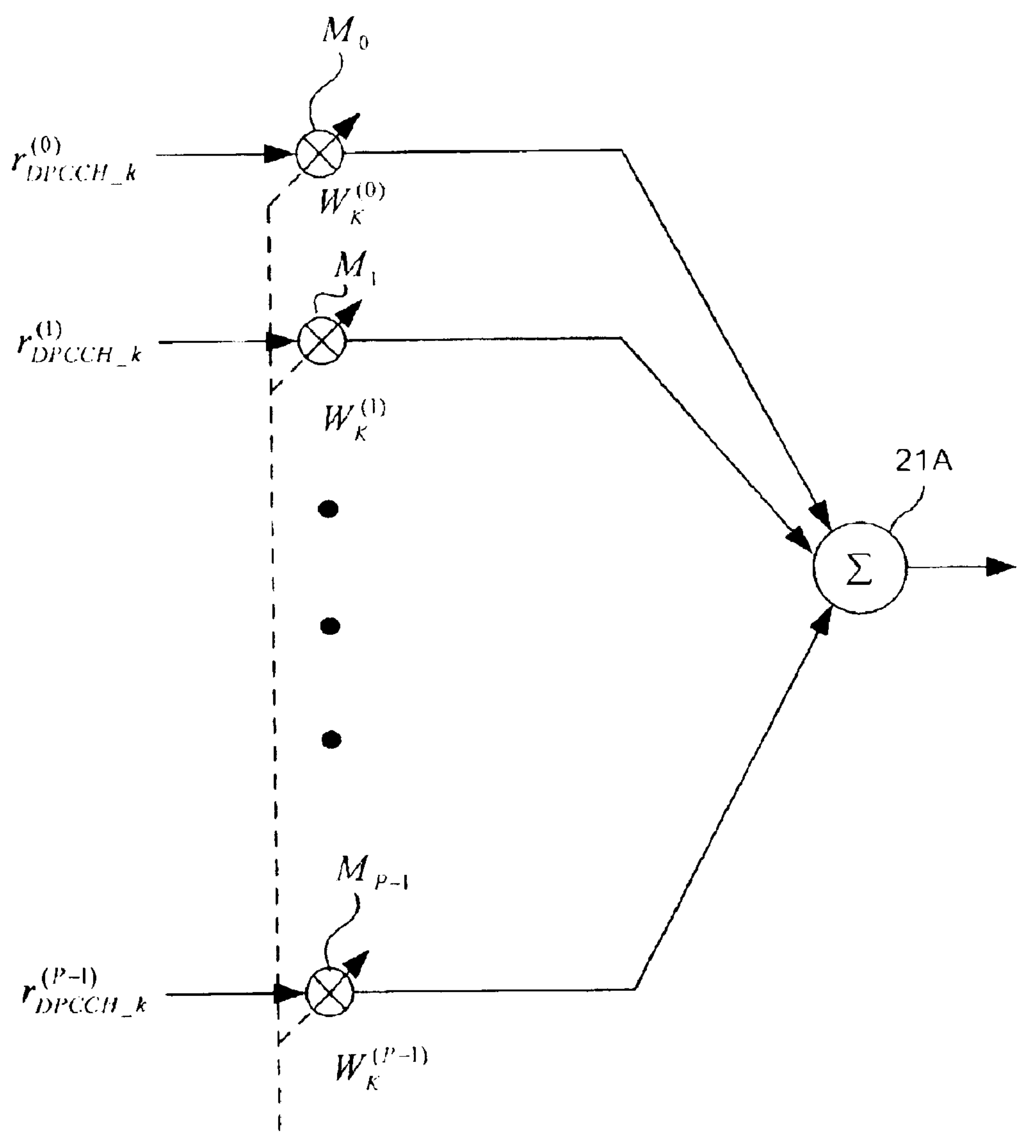
FIG. 3 is a diagram illustrating a beamformer of the beamforming apparatus of FIG. 2.

FIG. 3 shows additional detail of the DPCCH beamformer 13B of the adaptive beamforming apparatus of preferred embodiment.

As shown in FIG. 3, weight values of the DPCCH beamformer 13B are continuously updated. The DPCCH beamformer 13B multiplies signals $$(r^{(0)}_{DPCCH\_k} \sim r^{(P-1)}_{DPCCH\_k})$$

received through P antennas, after being despread, with corresponding weight vectors $$(w_k^{(0)} \sim w_k^{(P-1)})$$

at respective multipliers ($M_0$~$M_{p-1}$). The DPCCH beamformer 13B then sums the multiplication results at a summer 21. The weight vectors of the signals inputted to the DPDCH beamformer 13A are processed in the same manner.

An operation of the above-structured adaptive beamforming apparatus will next be described.

Once the radio signal $r_{DPCH\_k}$ is received through the antenna, the signal $r_{DPCH\_k}$ is despread by the first DPDCH despreader 11A and DPCCH despreader 11B. The signal despread by the DPCCH despreader 11B is then transmitted to the DPCCH beamformer 13B and the weight vector calculation module 12. The weight vector calculation module 12 calculates a weight vector of the signal outputted from the DPCCH despreader 11B in a unit of a symbol.

The uplink DPCCH frame consists of 15 slots, each of which is divided into a pilot sub-channel and a non-pilot sub-channel.

According to the preferred embodiment, two beamforming algorithms, i.e., a non-blind beamforming algorithm and a blind beamforming algorithm are used for forming the beam pattern. If the operative beamforming algorithm is converted from a first beamforming algorithm to a second beamforming algorithm, a last weight vector calculated by the first beamforming algorithm is used as an initial weight vector of the second beamforming algorithm. During calculation of the weight vector, the adaptive weight vector estimator 12A selects one of the LMS and CMA algorithms according to a type of sub-channel of the DPCCH slot, i.e., a pilot sub-channel and a non-pilot sub-channel. Thus, the adaptive weight vector estimator 12A enable the LMS algorithm relative to the pilot sub-channel and enables the CMA for the non-pilot sub-channel. The LMS and CMA algorithms used by the preferred embodiment are identical to those expressed as equations 1 and 2 of the related art.

The initial weight vector is set to 0. The weight vector for a first symbol of the pilot sub-channel is thus calculated on the basis of the initial value of 0. The weight vector is continuously updated in reference to the previous weight vector. Also, the weight vector of a first symbol in the non-pilot sub-channel, is calculated on the basis of the weight vector of the last symbol in the pilot sub-channel and the weight vector of the next symbol is continuously calculated by referring to the weight vector of the previous symbol as the initial weight vector.

Here, the weight vector calculation module 12 refers to frame and slot numbers that are provided by a DSP or an upper layer for updating the weight vector.

The weight vectors $$(w_k^{(0)} \sim w_k^{(P-1)})$$

updated at the weight vector calculation module 12 are preferably provided to the respective DPDCH beamformer 13A and DPCCH beamformer 13B. In the DPCCH beamformer 13B, the weight vectors are respectively multiplied with the input signals $$(r_{DPCCH\_k}^{(0)} \sim r_{DPCCH\_k}^{(P-1)})$$

at the respective multipliers ($M_0$~$M_{P-1}$). Recall that the input signals are signals received through P antennas and then despread. The multiplication result values are summed at the summer 21. The weight vectors $$(w_k^{(0)} \sim w_k^{(P-1)})$$

are also multiplied with the signals received through the antennas and the multiplication results are summed in the DPDCH beamformer 13A.

The output signal of the DPDCH beamformer 13A is temporally stored in the DPDCH data buffer 14 and the output signal of the DPCCH beamformer 13B is used for estimating a channel at the channel estimator 15.

The DPDCH data stored in the DPDCH data buffer 14 is next compensated with the output of the channel estimator 15 at the multiplier 16, and is then combined to a frame at the DPDCH combiner 17. The frame from the DPDCH combiner 17 is temporally stored in the frame buffer 18, and is then outputted after being despread at the second DPDCH despreader 19.

Figure 4:
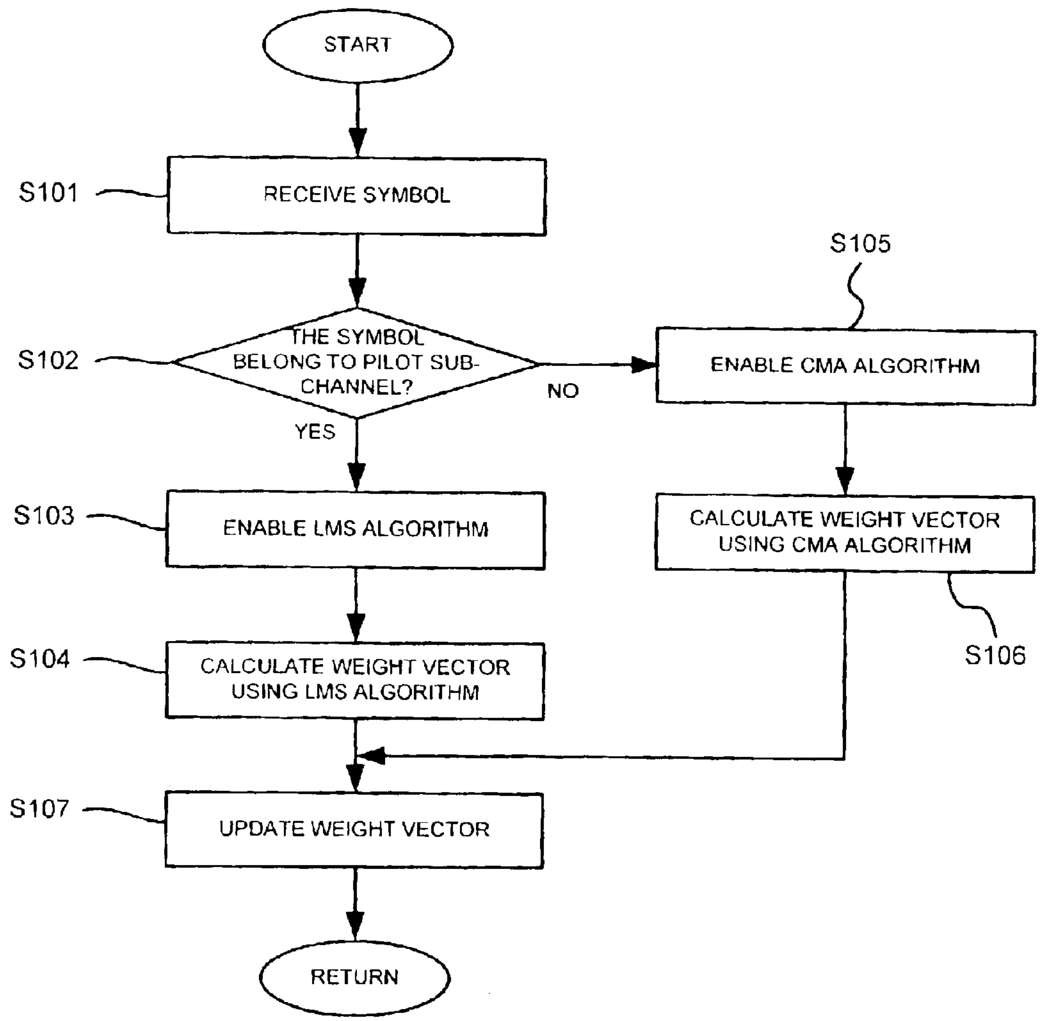
FIG. 4 is a flowchart illustrating an adaptive beamforming method according to a preferred embodiment of the present invention.

The adaptive beamforming method according to a preferred embodiment of the present invention will now be described with reference to FIG. 4. FIG. 4 is a flowchart illustrating an adaptive beamforming method according to a preferred embodiment of the present invention.

As shown in FIG. 4, a despread symbol is first received from the DPCCH despreader 11B, at step S101. Next, the weight vector calculation module 12 determines whether or not the symbol is in the pilot sub-channel of the DPCCH slot, as shown in step S102. If the symbol belongs to the pilot sub-channel, the weight vector calculation module 12 enables the LMS algorithm at step S103, and then calculates the weight vector using the LMS algorithm at step S104. On the other hand, if the symbol is in the non-pilot sub-channel, the weight vector calculation module 12 enables the CMA algorithm at step S105, and calculates the weight vector using the CMA algorithm at step S106.

If the pilot sub-channel transitions to the non-pilot sub-channel, the weight vector of the last symbol in the pilot sub-channel is used for calculating the weigh vector of the first symbol in the non-pilot sub-channel. If, on the other hand, the non-pilot sub-channel transitions to the pilot sub-channel, the weight vector of the last symbol of the non-pilot sub-channel is used for calculating the weight vector of the first symbol of the pilot sub-channel.

The system and method for adaptive beamforming according to the preferred embodiment have many advantages. For example, the adaptive beamforming apparatus and method of the preferred embodiment perform the weight vector update using both the LMS and CMA algorithms respectively for the pilot and non-pilot sub-channels such that it is possible to effectively reduce the interferences radiated from other mobile terminals by spatial filtering effect, resulting in increase of system capacity and coverage area.

Moreover, since LMS and CMA algorithms are simple relative to other beamforming algorithms, the adaptive beamforming apparatus and method of the preferred embodiment can be effectively employed to a smart antenna system.

Furthermore, in the adaptive beamforming apparatus and method of the preferred embodiment, the weight vector can be precisely calculated using an effective one of the LMS and CMA algorithms according to the situation such that the channel estimation accuracy can be enhanced using the reliable weight vector.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An adaptive beamforming apparatus, comprising:

a weight vector calculation module configured to select a beamforming algorithm according to a type of sub-channel of a pilot control channel to which a received symbol data belongs, and calculate a weight vector using the selected beamforming algorithm; and a beamformer configured to generate a beam pattern according to the weight vector calculated at the weight vector calculation module, wherein the type of sub-channel comprises a pilot sub-channel and a non-pilot sub-channel, wherein the selected beamforming algorithm is an LMS (Least Means Square) algorithm when the symbol data is of the pilot sub-channel and is a CMA (Constant Modulus Algorithm) when the symbol data is of the non-pilot sub-channel and wherein if the beamforming algorithm is converted from a first beamforming algorithm to a second beamforming algorithm a last weight vector calculated by the first beamforming algorithm is used as an initial weight vector of the second beamforming algorithm.

2. The apparatus of claim 1, further comprising a despreader to despread an input signal and output the symbol data.

3. The apparatus of claim 1, wherein the LMS beamforming algorithm is a non-blind beamforming algorithm and the CMA beamforming algorithm is a blind beamforming algorithm.

4. The apparatus of claim 1, wherein the sub-channel is a dedicated physical control channel (DPCCH) for transferring control information.

5. An adaptive beamforming method, comprising:

selecting an LMS (least means square) beamforming algorithm if a sub-channel of a pilot control channel to which an input symbol data belongs is a pilot sub-channel and selecting a CMA (Constant Modulus Algorithm) if the sub-channel is a non-pilot sub-channel;

updating a weight vector using the selected beamforming algorithm; and forming a beam pattern using the updated weight vector, wherein updating the weight vector comprises using a last weight vector calculated by a first beamforming algorithm as an initial weight vector of a second beamforming algorithm when the beamforming algorithm transitions from the first beamforming algorithm to the second beamforming algorithm.

6. The method of claim 5, wherein the CMA is a blind beamforming algorithm, and wherein the LMS is a non-blind beamforming algorithm.

7. The method of claim 5, wherein the sub-channel is a dedicated physical control channel (DPCCH) for transferring control information.

8. An adaptive beamforming method, comprising:

determining whether a symbol data belongs to a pilot sub-channel or a non-pilot sub-channel of a pilot control channel;

selecting a CMA (Constant Modulus Algorithm) if it is determined the symbol data belongs to the non-pilot sub-channel and selecting an LMS (Least Means Square) algorithm if it is determined the symbol data belongs to the pilot sub-channel;

updating a weight vector using the selected algorithm; and forming a beam pattern using the updated weight vector, wherein updating the weight vector comprises using a last weight vector calculated by a first beamforming algorithm as an initial weight vector of a second beamforming algorithm when the beamforming algorithm transitions from the first beamforming algorithm to the second beamforming algorithm.

9. The method of claim 8, wherein the sub-channel is a dedicated physical control channel (DPCCH) for transferring control information.

* * * * *